A. WINNIE.
ARTIFICIAL BAIT.
APPLICATION FILED AUG. 15, 1913.
1,102,312.
Patented July 7, 1914.
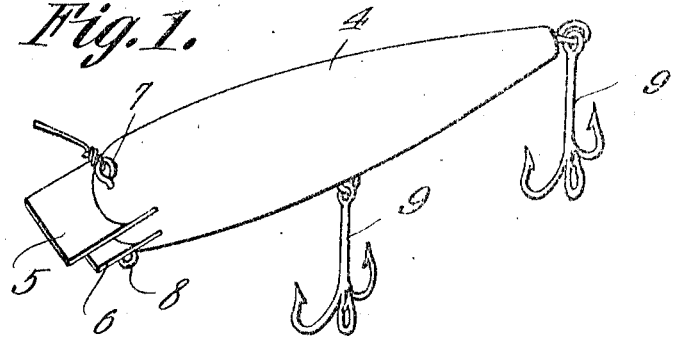
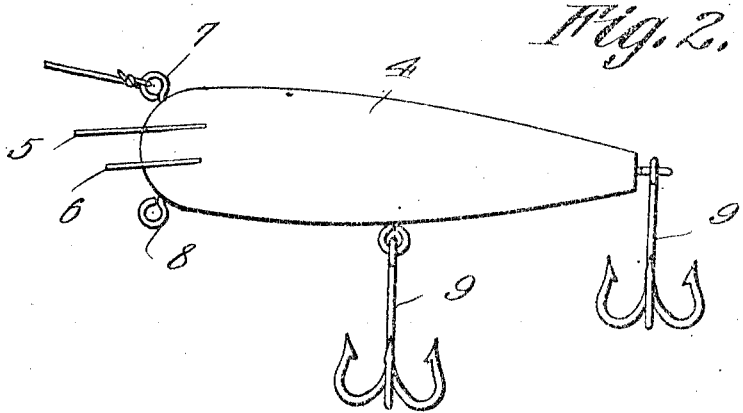
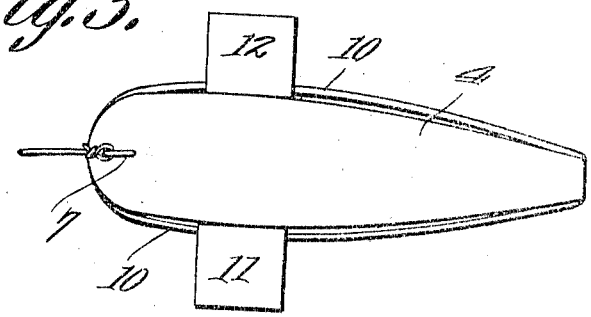
Witnesses
F. B. Wooden.
L. Willson.
Albert Winnie
Inventor,
by Cashow & Co.
Attorneys

UNITED STATES PATENT OFFICE.

ALBERT WINNIE, OF TRAVERSE CITY, MICHIGAN.

ARTIFICIAL BAIT.

1,102,312.  Specification of Letters Patent. Patented July 7, 1914.

Application filed August 15, 1913. Serial No. 784,957.

*To all whom it may concern:*

Be it known that I, ALBERT WINNIE, a citizen of the United States, residing at Traverse City, in the county of Grand Traverse and State of Michigan, have invented a new and useful Artificial Bait, of which the following is a specification.

This invention relates to improvements in artificial baits and more particularly to that class of bait which represents a live minnow while being drawn through the water.

An object of the present invention is to provide an artificial bait formed in the shape of a minnow and to provide planes secured thereto whereby the bait when drawn through the water may be made to dive, skip along the top of the water or remain in a floating and quiescent condition thereon.

A further object is to provide a buoyant artificial representation of a minnow with guide planes extending outwardly therefrom and at a slight angle thereto and to further provide means whereby the fish line may be secured to the top or bottom of the said bait whereby the planes may be made to point upwardly with the result that the bait will remain upon the surface of the water, or may be made to point downwardly with the result that the bait will dive into the depths of the water.

A further object is to provide a buoyant representation of a minnow with a plurality of fish hooks secured thereto and to secure an eyelet to the upper and lower front portion of the bait to which a fish line may be attached and to provide planes extending at an angle to the longitudinal axis of the bait and which are capable of moving the bait into the depths of the water, skipping it along the top surface thereof, or the said bait may be allowed to float quietly upon the surface of the water.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in perspective of my improved artificial bait. Fig. 2 is a side view in elevation thereof. Fig. 3 is a top plan view of a somewhat modified form of device embodying the features of my invention.

Referring to the drawings in which similar reference numerals designate corresponding parts throughout the several views, 4 is the body portion of the bait and is preferably formed in such a manner that it will be buoyant and float upon the surface of the water. The body portion 4 may be formed of cork, wood, or as a metallic shell containing air therein.

Rigidly secured to and extending beyond the front of the body portion are the planes 5 and 6 which as clearly illustrated in Fig. 2, extend at an angle to the longitudinal axis of the body portion and the plane 5 projects a slight distance beyond the plane 6. The provision of the two planes provides for the sure working of the device and provides that the artificial bait will more quickly respond to the pull upon the fish line.

Rigidly secured above and below the planes 5 and 6 are the two eyelets 7 and 8, which provide means whereby the fish line may be secured to the bait. Any number of hooks 9 may be secured to the body portion 4, the number and construction of which however does not in any way concern the present invention.

The modified form illustrated in Fig. 3 embodies the same principles as those already set forth, the difference being however that the plane whereby the bait is driven beneath the surface or raised to the top thereof, are slidably mounted upon a wire 10 which extends around the entire body portion 4. Thus the planes 11 and 12 may be moved to the front or rear of the body portion 4, it being noted however that they will at all times maintain an angle to the longitudinal axis of the body portion 4, substantially similar to the form illustrated in Figs. 1 and 2.

In the practical use of my improved bait, the fish line may be connected to either the eyelets 7 or 8. With the line secured to the eyelet 7 as illustrated in Fig. 2 and when the line is drawn rapidly forward, the pull being at the top portion of the body portion 4 will tend to lower the same in the body with the result that the planes 5 and 6 will point downwardly and the entire bait will dive to a depth proportional to the rate at which the bait is being drawn forwardly. Thus it will be apparent that in those instances where the fish remain in deep water, by securing the line to the eyelet 7 the bait will successfully submerge to any depth desired. When, however, on the contrary the bait is being used in shallow water or the fish tend to remain near the surface of the water, the line is changed and secured to the under eyelet 8, with the result that the pull being exerted at the under portion of the bait, the planes will be directed upwardly so that the same when being drawn forwardly and contacting with the water will cause the bait to skip over the top surface of the water. It is to be noted in this connection that the angle which the planes 5 and 6 make with the longitudinal axis of the body portion is of a slight degree and is for the purpose of neutralizing the natural tendency of the bait to remain upon the surface of the liquid due to its buoyant construction. Thus it will be apparent that with my improved artificial bait, by drawing the same forward with considerable speed the said bait will be driven to any desired depth. Also at a moderate or slow speed and with the line secured to the under portion of the bait, it can be drawn through the water in a substantially horizontal plane or made to skip along the top surface thereof. Furthermore due to the buoyant construction, the body portion 4 of the bait may be allowed to float upon the water should it be so desired.

Having thus fully described my invention, what is claimed is:—

An article of the class described comprising a fish-shaped body, a plane rigidly secured thereto and inclined with the longitudinal axis thereof, fish line engaging means secured to said fish-shaped body below the said plane, and fish catching means secured to the said body.

In testimony that I claim the foregoing as my own, I have hereto affixed my signature in the presence of two witnesses.

ALBERT WINNIE.

Witnesses:
CHAS. G. ALLEY,
HARRY MONROE.